Aug. 4, 1959   E. T. WHEELER   2,898,035
VENTILATOR FOR DOORS, WINDOWS AND OTHER OPENINGS
Filed July 25, 1956

Inventor
Everett T. Wheeler
by Roberts, Cushman + Grover
Attys

United States Patent Office 2,898,035
Patented Aug. 4, 1959

2,898,035

VENTILATOR FOR DOORS, WINDOWS AND OTHER OPENINGS

Everett T. Wheeler, Cambridge, Mass.

Application July 25, 1956, Serial No. 599,979

1 Claim. (Cl. 230—241)

This invention relates to ventilators for doors, windows and other openings, such as awnings, jalousies, shutters, etc. and has for its object the provision of ventilators which will not only permit the passage of air but will generate circulation of still air and which can also be closed to obstruct circulation of air or passage of light or both.

According to the present invention the ventilator comprises a frame, with louvers journaled in the frame in spaced relation so that they may make complete revolutions without interference, and means to revolve the louvers continuously in the same direction to produce air circulation. The driving means preferably includes a driven wheel at the end of each louver and a driver meshing with each of the wheels to maintain all of the louvers in the same angular positions at all times. To augment the circulation of air the cross-sections of the louvers are preferably concave on the leading side. The axis of each louver may be off-center or it may be approximately midway between its opposite edges to divide it into halves. In the latter case the cross-section of each half is preferably concave on the leading side.

For the purpose of illustration typical embodiments of the invention are shown in the accompanying drawings in which Fig. 1 is a front view of an awning embodying the present invention;

Figure 1:
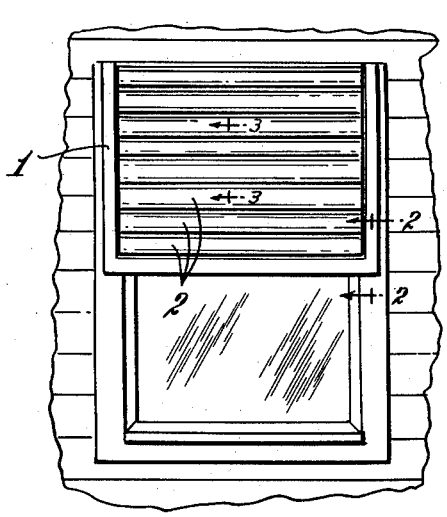

The particular embodiment of the invention shown in Figs. 1, 2, 3 and 5 comprises a frame 1 with louvers 2 journaled in opposite sides of the frame by means of pintles 3 having bifurcated ends 4 straddling the louvers and secured thereto by rivets 6. Fast to each pintle within the channel-shaped frame at one side of the frame is a pulley 7 having recesses to receive the teeth of a V-belt 8 which kinematically interconnects all of the louvers to revolve in unison so that they all are maintained in the same angular positions at all times, that is the louvers are always parallel in whatever angular position they occupy at any instant. Fast to the end of the pintle on the lowermost louver is a second V-pulley 9 having recesses to receive the teeth of a toothed feed belt 10. Mounted on one of the arms 11 of the frame 1 is a motor 12 for driving the louvers through the medium of the pulleys and belts.

Figure 3:
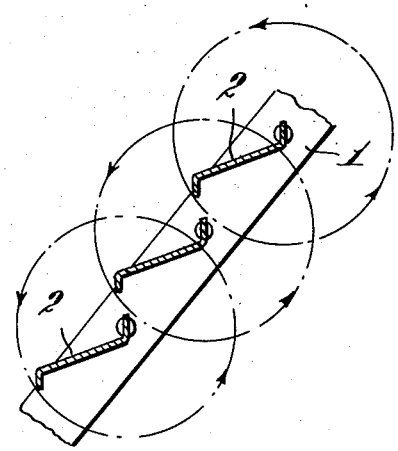
Fig. 3 is a section on line 3—3 of Fig. 1.

As shown in Fig. 3 each louver is preferably concave on its leading side so as to produce greater air circulation as it revolves. In Fig. 3 the axes of the louvers are off-center whereas in Fig. 4 they are approximately midway between the opposite edges of the louvers. When the axes are on-center as shown in Fig. 4 the halves of the louvers on opposite sides of the axes are each preferably concave on the leading side.

Figure 2:
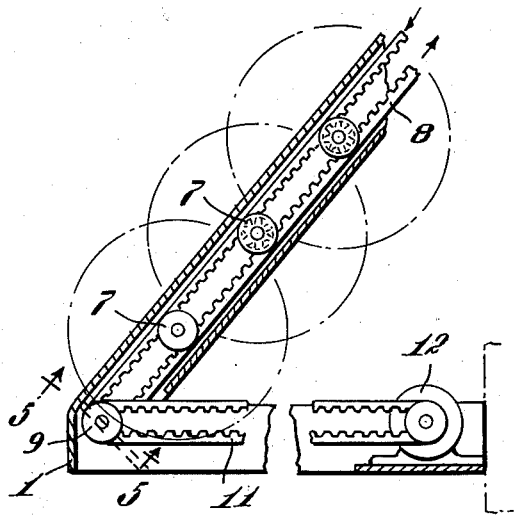
Fig. 2 is a section on line 2—2 of Fig. 1.
Figure 4:
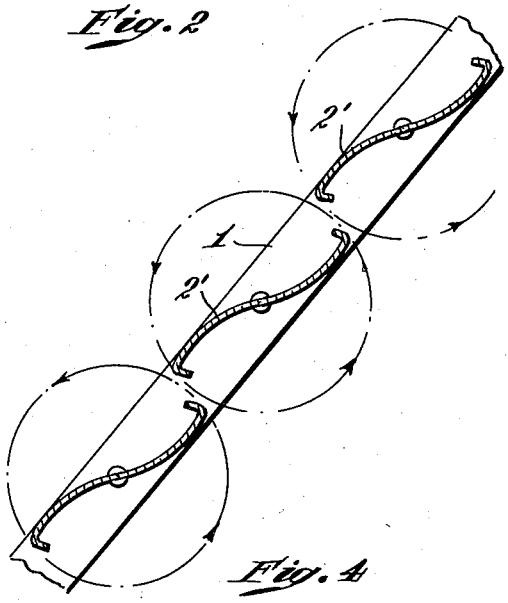
Fig. 4 is a similar section showing a modification.
Figure 5:
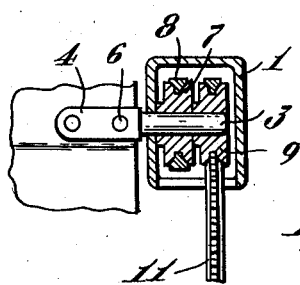
Fig. 5 is a section on line 5—5 of Fig. 2.

When the motor is running the louvers revolve in the direction indicated by the arrows in Figs. 3 and 4, thereby producing air circulation even when there is no breeze. When the motor 12 is stopped the louvers are preferably left in the positions shown in Figs. 3 and 4 so that they serve effectively to keep out rain. When used as an awning or as a shutter the louvers are preferably opaque so as to exclude light as well as rain when set in the position shown in Figs. 3 and 4. To admit light they may be turned to positions at right angles to those illustrated. When used as shutters the frame 1 is preferably mounted parallel to the window in the usual way instead of being mounted at an angle as shown in Fig. 2. When used as jalousies the louvers are preferably transparent.

It should be understood that the present disclosure is for the purpose of illustration only and that this invention includes all modifications and equivalents which fall within the scope of the appended claim.

I claim:

An awning comprising a frame having sloping side arms, louvers extending horizontally from arm to arm, means rotatably supporting the ends of the louvers on the arms, and means for continuously rotating the louvers in unison to circulate air, the louvers being spaced apart sufficiently to permit simultaneous rotation without interference but close enough together so that each louver overhangs the next lower louver when the louvers are stopped in the position where they incline outwardly and downwardly so as to shed rain as well as obstruct sunlight.

References Cited in the file of this patent

UNITED STATES PATENTS

| 139,355 | Barton | May 27, 1873 |
| 697,448 | Coleman | Apr. 15, 1902 |
| 1,005,572 | Parkerson | Oct. 10, 1911 |
| 1,039,196 | Richards | Sept. 24, 1912 |
| 1,211,150 | Hepsley | Jan. 2, 1917 |
| 1,371,936 | Rubino | Mar. 15, 1921 |
| 1,390,438 | Himmel | Sept. 13, 1921 |
| 1,860,068 | Bassler | May 24, 1932 |